US008624519B2

(12) United States Patent
Beasley

(10) Patent No.: US 8,624,519 B2
(45) Date of Patent: Jan. 7, 2014

(54) VARIABLE LOAD LINE GAS CURVE INTERCEPT METHOD TO OPTIMIZE SYSTEM EFFICIENCY

(75) Inventor: Denny D. Beasley, La Grange Park, IL (US)

(73) Assignee: Robertson Transformer Co., Blue Island, IL (US)

( * ) Notice: Subject to any disclaimer, the term of this patent is extended or adjusted under 35 U.S.C. 154(b) by 257 days.

(21) Appl. No.: 13/140,904

(22) PCT Filed: Dec. 18, 2009

(86) PCT No.: PCT/US2009/068676
§ 371 (c)(1),
(2), (4) Date: Jul. 29, 2011

(87) PCT Pub. No.: WO2010/080587
PCT Pub. Date: Jul. 15, 2010

(65) Prior Publication Data
US 2011/0279052 A1  Nov. 17, 2011

Related U.S. Application Data

(60) Provisional application No. 61/138,770, filed on Dec. 18, 2008.

(51) Int. Cl.
*H05B 41/16* (2006.01)

(52) U.S. Cl.
USPC ........................... 315/246; 315/248; 315/291

(58) Field of Classification Search
None
See application file for complete search history.

(56) References Cited

U.S. PATENT DOCUMENTS

| 5,191,261 | A | | 3/1993 | Mass |
| 5,373,217 | A | * | 12/1994 | Gregor ......................... 315/248 |
| 5,477,112 | A | * | 12/1995 | Lesea ............................. 315/219 |
| 5,504,398 | A | | 4/1996 | Rothenbuhler |
| 5,739,644 | A | * | 4/1998 | Bernitz et al. ................. 315/289 |
| 6,225,756 | B1 | * | 5/2001 | Gitsevich ....................... 315/248 |
| 6,313,584 | B1 | * | 11/2001 | Johnson et al. .......... 315/111.21 |
| 6,359,393 | B1 | | 3/2002 | Brown |
| 6,388,394 | B1 | | 5/2002 | Mita et al. |
| 6,424,099 | B1 | * | 7/2002 | Kirkpatrick et al. .......... 315/248 |
| 7,221,102 | B2 | * | 5/2007 | Kotani et al. .................. 315/248 |
| 2003/0127998 | A1 | | 7/2003 | Notarianni et al. |
| 2004/0232855 | A1 | | 11/2004 | Ribarich et al. |
| 2005/0035729 | A1 | | 2/2005 | Lev et al. |
| 2007/0252532 | A1 | | 11/2007 | DeVincentis et al. |
| 2008/0157692 | A1 | | 7/2008 | Ichikawa et al. |

OTHER PUBLICATIONS

Robertson Transformer Co., International Search Report from PCT/US09/68676 mailed Feb. 23, 2010 from the United States Patent and Trademark Office acting as International Searching Authority.

* cited by examiner

*Primary Examiner* — Crystal L Hammond
(74) *Attorney, Agent, or Firm* — Conley Rose, P.C.; Grant Rodolph

(57) ABSTRACT

The operation of gas discharge devices involves stabilizing drive stage with a highly dynamic load exhibiting both negative resistance and non-linear behavior. Stabilization is typically accomplished by inserting impedance in series with the plasma load so the combination impedance has a voltage division that is characterized by the intersection of the linear series impedance and the instantaneous voltage-current. This is stable as long as there is an ample excess of voltage driving the plasma/series impedance complex. However providing series impedance that insures stable operation over varying power levels, lamp types/chemistries and changes resulting from aging can lead to inefficient operation as a result of either high voltage/power drops in the series impedance or a high source voltage driving smaller impedance. A method to optimize the series impedance and driving voltage through a dynamic adjustment process of both the voltage and impedance parameters to provide stable gas plasma drive and maximize system efficiency is described.

18 Claims, 13 Drawing Sheets

LOAD LINE TRANSITION

SEQUENCE (START) AFTER AVALANCHE PATH ㊻ EQUILIBRATING TO ㊼ ON COLD OR T1 CURVE (WARM UP) ㊼ TO HIGHER TEMPERATURE CURVE T2

US 8,624,519 B2

VARIABLE LOAD LINE GAS CURVE INTERCEPT METHOD TO OPTIMIZE SYSTEM EFFICIENCY

CROSS-REFERENCE TO RELATED APPLICATION

This application is a 35 U.S.C. §371 filing from International Application No. PCT/US2009/068676 filed on Dec. 18, 2009, which claims the priority of U.S. Provisional Patent Application No. 61/138,770 filed Dec. 18, 2008, the contents of which are incorporated herein by reference.

TECHNICAL FIELD

The present invention is related to improving efficiency of lighting fixtures. More particularly, the present invention is related to a method of improving efficiency of lighting fixtures using a variable load line gas curve intercept method.

BACKGROUND OF THE INVENTION

Gas-discharge lamps are a family of artificial light sources that generate light by sending an electrical discharge through an ionized gas, i.e. a plasma, in a transparent tube. The character of the gas discharge critically depends on the frequency or modulation of the current. Typically, such lamps use a noble gas (argon, neon, krypton and xenon) or a mixture of these gases. Most lamps are filled with additional materials, like mercury, sodium, and/or metal halides. In operation, the gas is ionized, and free electrons, accelerated by an electrical field in the tube, collide with gas and metal atoms. Some electrons circling around the gas and metal atoms are excited by these collisions, bringing them to a higher energy state. When the electron falls back to its original state, it emits a photon, resulting in a visible light or ultraviolet radiation. Ultraviolet radiation is converted to visible light by a fluorescent coating on the inside of the tube's surface for some lamp types. The fluorescent lamp is perhaps the best known gas-discharge lamp.

Gas-discharge lamps offer long life and high light efficiency, but are more complicated to manufacture, and they require electronics to provide the correct current flow through the gas.

A high-intensity discharge (HID) lamp is a type of electrical lamp which produces light by means of an electric arc between tungsten electrodes housed inside a translucent or transparent fused quartz or fused alumina arc tube. This tube is filled with both gas and metal salts. The gas facilitates the arc's initial strike. Once the arc is started, it heats and evaporates the metal salts forming a plasma, which greatly increases the intensity of light produced by the arc and reduces its power consumption. High-intensity discharge lamps are a type of arc lamp.

Compared with fluorescent and incandescent lamps, HID lamps have higher luminous efficacy since a greater proportion of their radiation is in visible light as opposed to heat. Their overall luminous efficacy is also much higher: they give a greater amount of light output per watt of electricity input.

Various different types of chemistry are used in the arc tubes of HID lamps depending on the desired characteristics of light intensity, correlated color temperature, color rendering index (CRI), energy efficiency, and lifespan. Varieties of HID lamp include: mercury vapor lamps, metal halide (MH) lamps, ceramic MH lamps, sodium vapor lamps, xenon short-arc lamps, and ultra-high performance (UHP).

Like fluorescent lamps, HID lamps require a ballast to start and maintain their arcs. The method used to initially strike the arc varies: mercury vapor lamps and some metal halide lamps are usually started using a third electrode near one of the main electrodes while other lamp styles are usually started using pulses of high voltage.

HID lamps are typically used when high levels of light over large areas are required, and when energy efficiency and/or light intensity are desired. These areas include gymnasiums, large public areas, warehouses, movie theaters, football stadiums, outdoor activity areas, roadways, parking lots, and pathways. More recently, HID lamps, especially metal halide, have been used in small retail and residential environments. HID lamps have made indoor gardening practical, particularly for plants that require a good deal of high intensity sunlight. They are also used to reproduce tropical intensity sunlight for indoor aquariums. Ultra-High Performance (UHP) HID lamps are used in LCD or DLP projection TV sets or projection displays.

Beginning in the early 1990s, HID lamps have been employed in motor vehicle headlamps. HID lamps are also used in high-performance bicycle headlamps as well as flashlights and other portable lights, because they produce a great amount of light per unit of power. As the HID lights use less than half the power of an equivalent tungsten-halogen light, a significantly smaller and lighter-weight power supply can be used. HID lamps have also become common on many aircraft as replacements for traditional landing and taxi lights.

Factors of wear come mostly from on/off cycles versus the total on time. The highest wear occurs when the HID burner is ignited while still hot and before the metallic salts have recrystallized. At the end of life, many types of high-intensity discharge lamps exhibit a phenomenon known as cycling. These lamps can be started at a relatively low voltage. As they heat up during operation, however, the internal gas pressure within the arc tube rises and a higher voltage is required to maintain the arc discharge. As a lamp gets older, the voltage necessary to maintain the arc eventually rises to exceed the voltage provided by the electrical ballast. As the lamp heats to this point, the arc fails and the lamp goes out. Eventually, with the arc extinguished, the lamp cools down again, the gas pressure in the arc tube is reduced, and the ballast can once again cause the arc to strike. The effect of this is that the lamp glows for a while and then goes out, repeatedly.

SUMMARY OF THE INVENTION

A first aspect of the present invention is directed to a method of controlling and regulating a power supply attached to a non-linear plasma load. The method comprises the steps of: utilizing a multi-parametric load line intercept control of a series source impedance; sequencing of a voltage and a frequency control; allowing a highly dynamic gas plasma load curve to be tracked through a load dynamic without a loss of conduction or plasma stability; and shaping of an initial current, as a load is energized during a conduction cycle, wherein a means of feedback is provided as to the appropriateness and quality of the adjustment.

The first aspect of the present invention may include one or more of the following steps, alone or in any combination as reasonably possible. The method may further comprise the step of: regulating the frequency and the voltage to move a load line intercept with a thermally variable voltage/current characteristic of a plasma of the non-linear plasma load. The method may further comprise the step of: controlling the frequency and the voltage at a plurality of different points/conditions of the plasma. The method may further comprise the step of: identifying an initial rise of a current to indicate plasma stability. The method may further comprise the step of: comparing a predetermined absolute value related to the current to an ideal value. The method may further comprise the steps of: continuously determining separate comparative values related to the current over a period of time; and comparing each subsequent comparative to a preceding comparative value to determine an operating condition of the non-linear plasma load. The method may further comprise the step of: utilizing both a resonant and a non-resonate power stage design. The method may further comprise the step of: identifying a zero cross-point gating signal for a conduction current ramp up area capture.

A second aspect of the present invention is also directed to a method for controlling and regulating a power supply attached to a non-linear plasma load. This method comprises the steps of: sampling an initial current rise signal over a predetermined time period in the non-linear plasma load upon an initial powering of the non-linear plasma load; converting the initial current rise signal from an analog signal to a digital signal; integrating the digital signal over the predetermined time period to arrive at comparison value; comparing the comparison value against a known ideal condition; and increasing a voltage supplied to the non-linear plasma load if the comparison value is lower than the known ideal condition to continue a powering of the non-linear plasma load.

The second aspect of the present invention may include one or more of the following steps, alone or in any combination as reasonably possible. The method may further comprise the step of: sampling a current signal over a plurality of separate predetermined time periods of identical duration wherein a plurality of current signal samples are acquired at discreet points in time. The method may further comprise the step of: converting each current signal sample from an analog signal to a digital signal. The method may further comprise the step of: integrating each digital signal over the predetermined time period to arrive at a plurality of successive comparison values. The method may further comprise the step of: comparing each subsequent value of the plurality of successive comparison values to a preceding value of the plurality of successive comparison values. The method may further comprise the step of: comparing each subsequent value of the plurality of successive comparison values to a preceding value of the plurality of successive comparison values. The method may further comprise the step of: determining an operating condition of the non-linear plasma load based on a result of the comparing each subsequent value of the plurality of successive comparison values to a preceding value of the plurality of successive comparison values step. The method may further comprise the step of: determining an impending end-of-life operating condition of the non-linear plasma load by comparing the successive comparison values to a known operating control range of a ballast. The method may further comprise the step of: generating an end-of-life flag in response to an end-of-life condition as determined by the comparison of the successive comparison values the known operating control range of the ballast. The method may further comprise the step of: automatically locking out the ballast in response to the end-of-life flag.

BRIEF DESCRIPTION OF THE DRAWINGS

To understand the present invention, it will now be described by way of example, with reference to the accompanying drawings in which.

DETAILED DESCRIPTION

Figure 1:
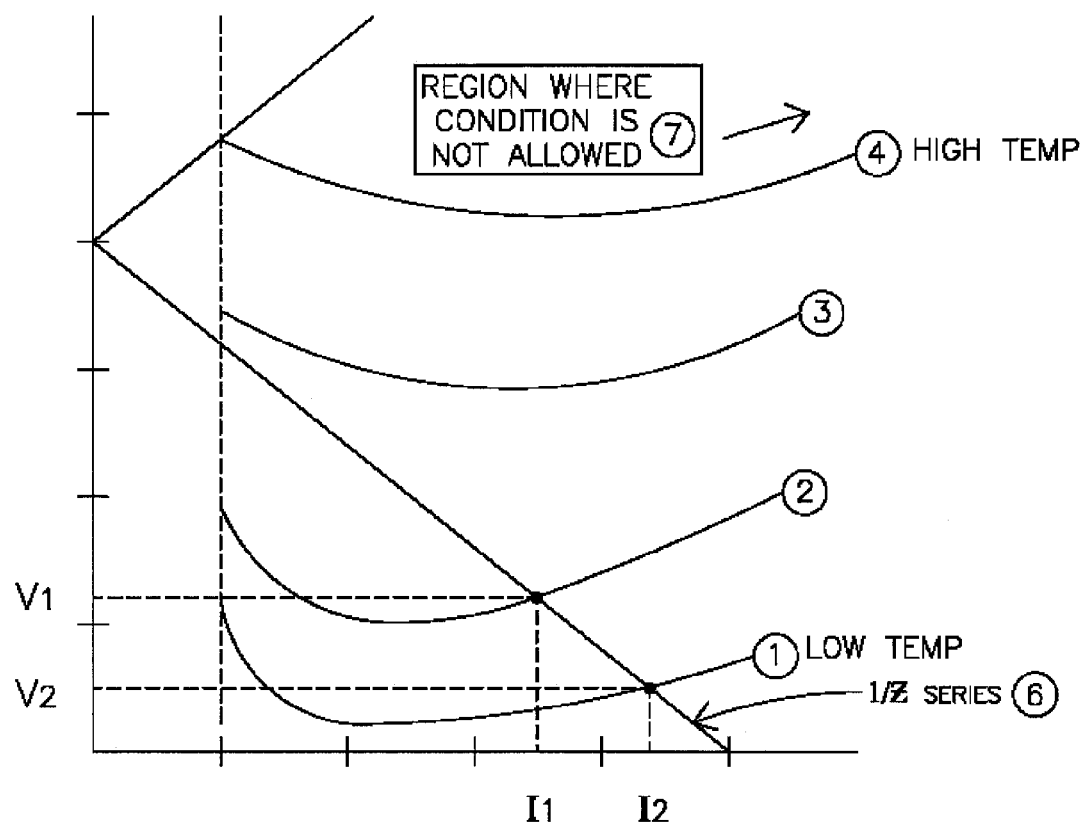
FIG. 1 is a graph showing the V-I characteristics of a plasma load at multiple temperatures/power levels (1, 2, 3, 4)

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention addresses an approach to the operation and stabilization of gas plasma loads. This is accomplished by sensing how fast the plasma goes in conduction as it goes through a zero cross point of the cyclic load driving voltage. A period $T_{sample}$ area just after the zero cross would ideally behave like a pure resistance, and thus it would follow the voltage precisely. When the plasma approaches a condition that is near extinguishing, the current at low voltage such as that near the zero cross point will increase very little at first and then quickly increase, but it does not linearly follow the driving voltage. When this is sensed—by looking at the integral of the current in time during this narrow time slice—and it is decreased since last cycle, we know not to alter the frequency unit until the $T_{sample}$ period has once again become cycle to cycle stable. Voltage control is followed before frequency control.

FIG. 1 shows the voltage-current (V-I) characteristics of a plasma load of a gas-discharge lamp at multiple temperatures/power levels (1, 2, 3, 4). A negative resistance that is characteristic of a gas plasma load is illustrated. A classic method for dealing with such a load is by superimposing linear impedance 6 over the nonlinear impedance of the plasma load. The intersection of the two curves provides the distribution of the voltage of the two circuit elements. Certain regions of the curve complex are not permissible regions for operation and result in no conduction in the plasma load. Loss of conduction in many applications may result in extended recovery time for resumption of conduction and normal operation.

Referring to FIG. 1, an area 7 to the right of a dashed terminus line of curves 1, 2, 3, 4 and above the superimposed resistive line 6 is shown, the lamp is always nonconductive in this region.

Figure 2:
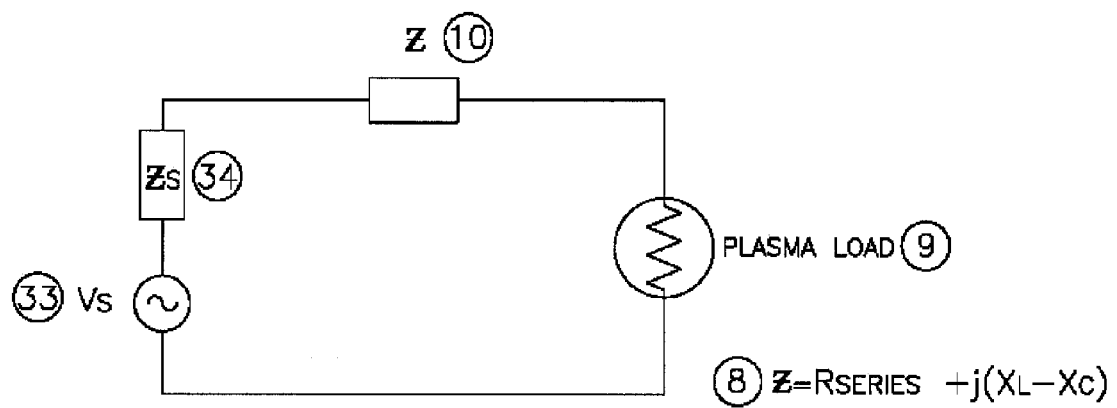
FIG. 2 is a circuit diagram of the energy limiting series impedance connected in series to the plasma load.

An example circuit is illustrated in FIG. 2. The circuit can be a complex impedance of both reactive and resistive elements or substantially one or the other. $Z_s$ 34 is parasitic impedances associated with a source voltage (Vs) 33 that feeds the series connected load line impedance (Z) 10 and lamp plasma load represented by 9. In the circuit schematic of FIG. 2, the load line is nearly pure resistance if $j(X_L-X_C)=0$ (reactive component) in equation 8, or nearly pure reactance if $R_{series}=0$. It is clear that if the impedance 10 is resistive, at any significant current/power levels, losses in a resistive element would be substantial and would yield low efficiency due to high $I^2R$. It is more practical to use a reactive element where it is common to be net inductive to limit turn on losses by controlling the di/dt, through action of the series inductance in the power driver.

Figure 3:
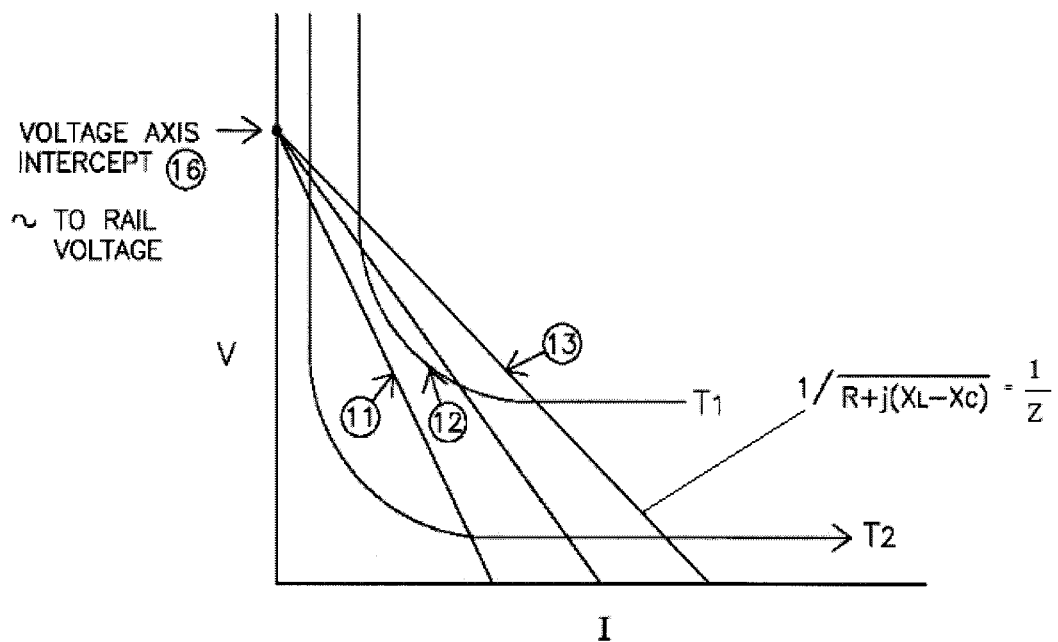
FIG. 3 is a graph showing movement of the slope of the load line with frequency as one control variable.

FIG. 3 shows several potential load lines 11, 12, 13, and the possible intercept points on the gas plasma load lines at two different plasma temperatures $T_1$ and $T_2$ at different control conditions. It is well known in the art that with frequency, as the control variable, and a substantially inductive series element, the slope of the load line can be moved around the voltage axis intercept 16, as seen in FIG. 3 line 11 at a lower frequency, line 12 higher than line 11, and line 13 higher than line 11 and 12. Also, it is known that by adjusting the voltage intercept point 16 determined by the voltage source 33 of FIG. 2, the load line position can be altered, but unlike the frequency control parameter, the slope remains constant.

Figure 4:
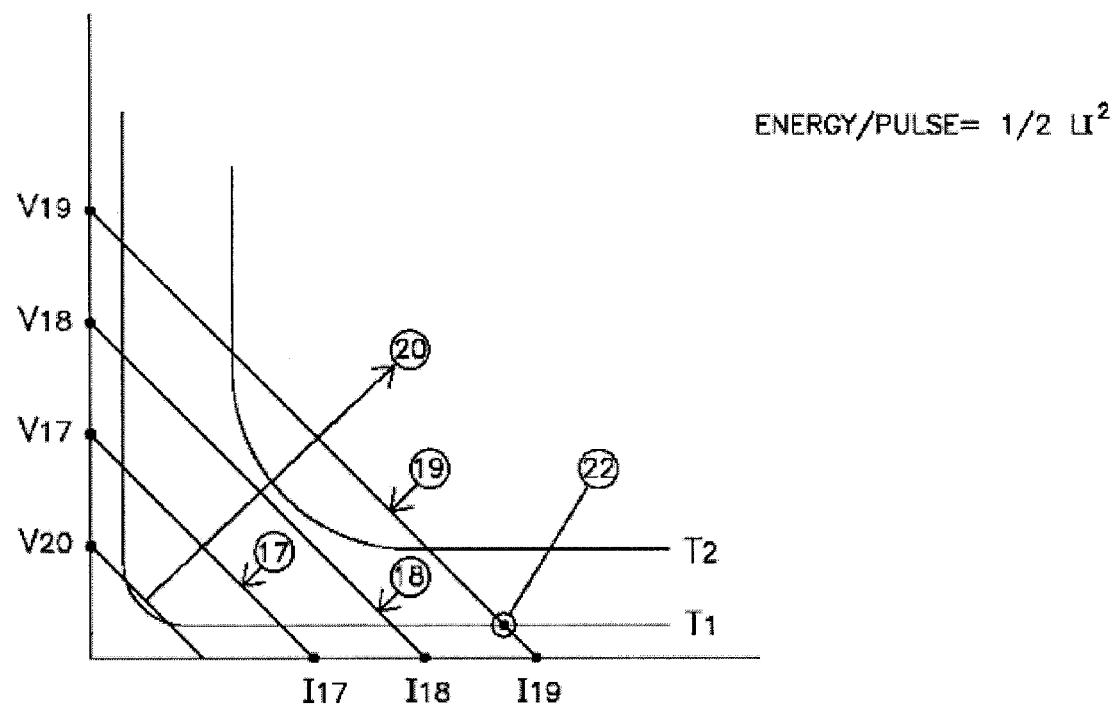
FIG. 4 is a graph showing the direction of change of the load lines 17, 18, and 19.

FIG. 4 shows the direction of change off the load lines 17, 18 and 19. The direction of change is in the direction of a line perpendicular 20 to the slope of any one of the lines at a constant frequency, or in other words, if the frequency is constant, and the DC rail voltage is increased from $V_{17}$ to $V_{18}$ and then to $V_{19}$, the three load lines 17, 18 and 19 will be parallel.

By combing the two effects, and applying different criteria for load line manipulation for each phase of lamp operation, efficiency and performance can be optimized and many of the negative issues of HID lighting can be addressed, such as but not limited to: (1) slow ramp up of lamp (on a conventional ballast); (2) larger changes in the lamp parameters as it ages; (3) difficulty of driving different lamp types of the same wattages (e.g. quartz vs. ceramic styles); and (4) end of life issues associated with aged lamps.

Figure 5A:
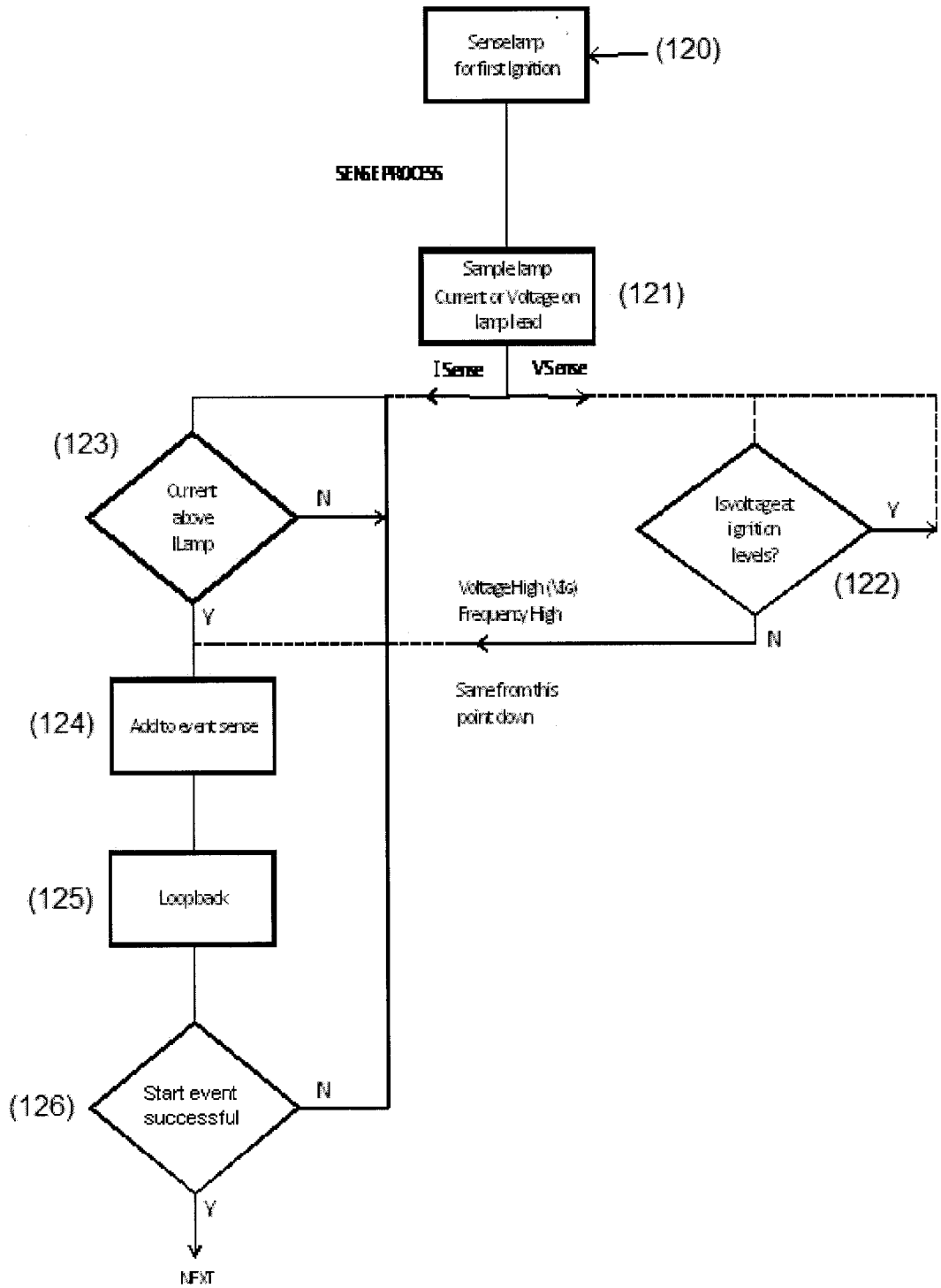
FIG. 5a is a flowchart diagram of the process of sensing the lamp to first ignition.

FIG. 5a shows the initial logic flow of one possible start scenario where a lamp requires a high voltage to initialize an avalanche process. In an initial phase, the first point can be well into the kilovolt range. Once avalanche is completed, the impedance of the lamp is low and can be seen in FIG. 4 curve $T_1$ at the intercept 22. The start process requires a high current capability to pass enough power to the lamp while it is cold and at a low voltage.

In FIG. 5a steps 120 and 121, the lamp is sensed for first current flow or very low voltage or both. When the voltage sense is used the right hand branch is used labeled $V_{Sense}$, the lamp is tested for low voltage condition that would typify levels that are typical of a plasma load at lower temperatures and levels, typically about 25% of the voltage at nominal temperatures and pressures. When the current is sensed, the start condition can be from 25% higher to as high as 3 times nominal current. The event once confirmed by step 122 or 123 or both. Step 124 counts the ignition event for storage as to the number of start events that plasma load has encountered. Step 125 begins possible loop back scenario. Step 126 determines if the start sequence is successful and is where the control logic would intercede if a large number of ignitions occurred in a short period of time. The determination would be made based on an expected usage template.

Figure 5B:
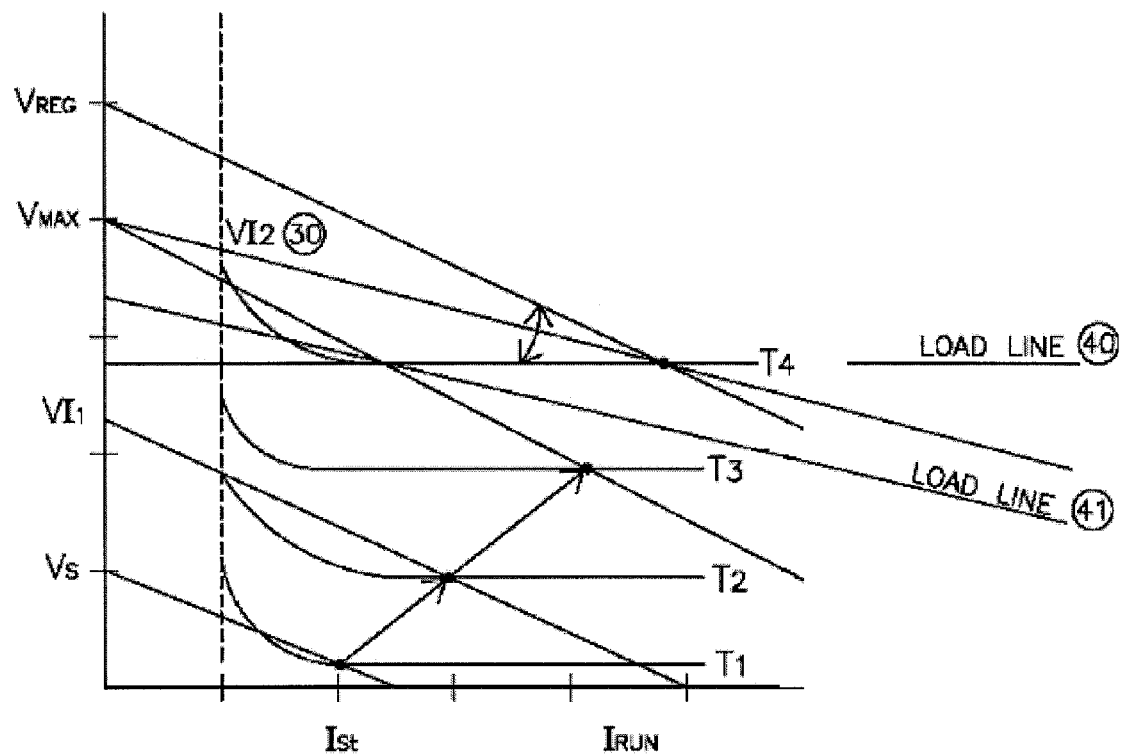
FIG. 5b is a graph of a load line diagram showing the output stage at the lowest possible operating losses.

FIG. 5b show there are an infinite series of gas curves T1, T2, T3, ... T∞, each dependent on a plasma temperature. The lamp will transition from a cooler low pressure condition where an electron temperature is higher than that of an atomic species (mercury, scandium etc) to a high pressure condition where an electron temperature is nearly equal to that of an atomic species. The latter being an equilibrated condition.

Some of the curves at hypothetical temperatures are shown on the graph of FIG. 5a as $T_1$ and $T_2$, keeping in mind there is a unique curve for each thermal operating condition. With this understanding, and the ability to alter the external load line and therefore its point of equilibration, it is possible, by using a reactive element either from a resistor, inductor, capacitor resonant circuit (RLC) combination, capacitive or inductive singularly.

It can be seen in the gas curves of FIG. 4 that if the applied voltage is $V_{19}$, the load line and the plasma curve intercept, there is a large amount of reactive energy flow and very little real power to the load. This reactive energy now has to flow back to the rail through the output stage. The flow of high levels of energy will generate high levels of losses in the output stage. However, in FIG. 4, if the applied voltage is reduced to the lower levels shown as $V_{17}$ and $V_{29}$, the amount of reactive energy that the drive components have to switch is greatly reduced, yet still keeps current flow in the lamp. By adjusting the applied voltage to the series impedance that is itself connected in series with the plasma load, the plasma can be kept conductive while at the same time limit the amounts of energy switched through the voltage generation means 32 as shown in FIG. 2.

Viewed from an impedance matching perspective, the lamp starts at a low impedance and progresses to a higher impedance. The output stage at a set frequency and a set voltage will have fixed impedance. This mismatch increases the time for the lamp to come to an equilibrated condition as a result. Ideally, the voltage source impedance would be equal to the load impedance maximum energy transfer, but the plasma load impedance is changing each moment from the point of ignition to its full power equilibrated condition.

This method applies to frequencies of operation whose cycle period is beyond the thermal time constants of the gas and its physical support structures as well beyond the range of possible acoustic resonance. Otherwise, the impedance of the lamp is very dynamic as its temperature changes and thus is far less predictable.

This is where manipulation of a load line intersection angle comes into play. A multi-parametric load line intercept control of a series source impedance is utilized. To minimize ramp up to full power, a combination of voltage and frequency is used to adjust the effective impedance to match the plasma load impedance and at the same time assure that the proper voltage conditions are met to sustain the lamp's path to full power. Thus, a voltage and a frequency can be sequenced. A highly dynamic gas plasma load curve can be tracked through a load dynamic without a loss of conduction or plasma stability. This condition is ideal for putting as much power into the lamp as quickly as possible to minimize ramp up time; however, the criteria will change as the lamp enters its full power condition.

Figure 6A:
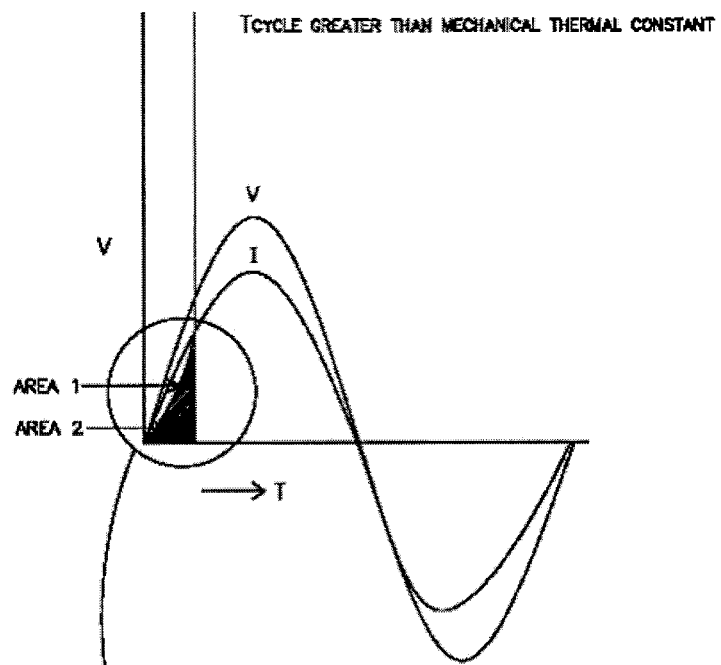
FIG. 6a is a graph showing area 1 and area 2 over the sample period $T_{sample}$.

The issue now becomes how to know, from an external standpoint, that the lamp has achieved a new thermally equilibrated condition. This is done by noting the change in current wave shape in a small region early in the lamp drive current wave-shape. In FIG. 6a, a sinusoidal drive current and a small time slice $T_{sample}$ is illustrated. A line V represents the voltage, and two other lines $I_1$ and $I_2$ are two possible currents that could exist. The current $I_1$ is the ideal, and it is a scaled version of the voltage, while the current $I_2$ shows a much slower rate of rise than the voltage V. This slow rise of current signals will slow production of available charged species (free electrons for that early rise of voltage from the zero cross point). This would flag that the load line intercept is approaching a critical point where there is insufficient potential for the generation of free charge, and when it is time to increase the applied voltage. What is not apparent is that a decrease in frequency would decrease the initial slope of the applied sine wave and further delay the generation of free charge during the sample period. During the initial ramp-up, voltage should be the parameter of control not frequency.

The process after the lamp's transition into thermionic operation would be to sample in the early part of the current wave-shape. A value representing the area such as area 1 and area 2 over the sample period $T_{sample}$. This would be compared to either an accumulation of previous area captures while looking to identify a downward transition or comparing it to the ideal condition. If the new value is smaller than the old, the voltage needs to be incremented upwardly to continue power ramp up. This process continues until the plasma load is at set power level. The end of this flags the end of the ramp up period. However, it has progressed interactively with the lamp and in a minimum time and minimum stress on the voltage source generation circuitry.

Figure 7:
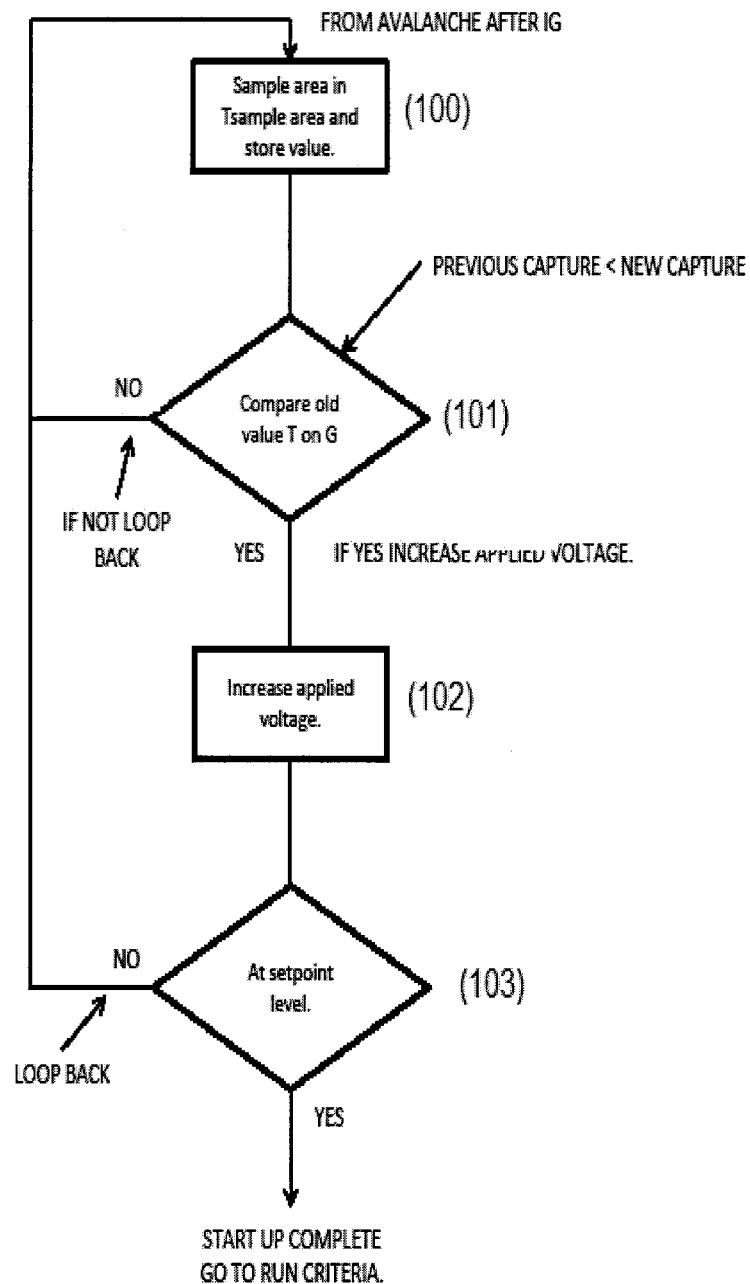
FIG. 7 is the continued process flowchart diagram depicting the plasma load at set power level.

This process flow for $T_{sample}$ capture can be seen in FIG. 7. First the $T_{sample}$ area is captured and stored 100. The next step 101 compares the new to the old value and determines if additional voltage is needed to move operation closer to nominal. If yes, then the applied voltage is increased 102. During startup it should increase on each half cycle of the load current until equilibrium is achieved at the nominal power value. When $T_{sample}$ becomes near static control passes step 103 to a run control loop illustrated in FIG. 8.

Figure 8:
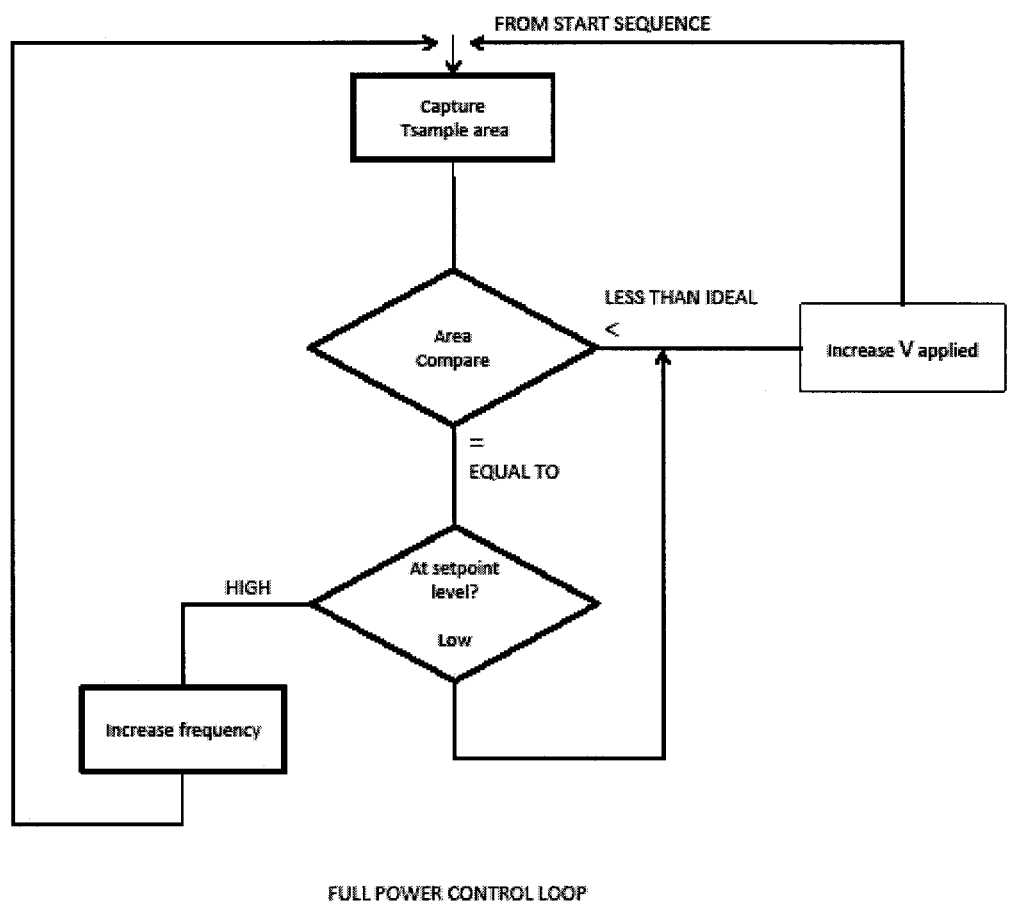
FIG. 8 is a flowchart diagram of a full power control loop.

In FIG. 8, the $T_{sample}$ area continues to be captured stored and compared. However, in the run condition, $T_{sample}$ area should remain constant. If, on a capture, $T_{sample}$ is lower than the last, the plasma is indicating that more voltage is required across the lamp to stay in conduction. If the $T_{sample}$ areas are stable—not changing half cycle to half cycle—the control passes to the frequency variable where if the power is high the frequency is increased and if power is low the frequency will decrease. Frequency control is allowed only when the $T_{sample}$ area is stable.

Figure 6B:
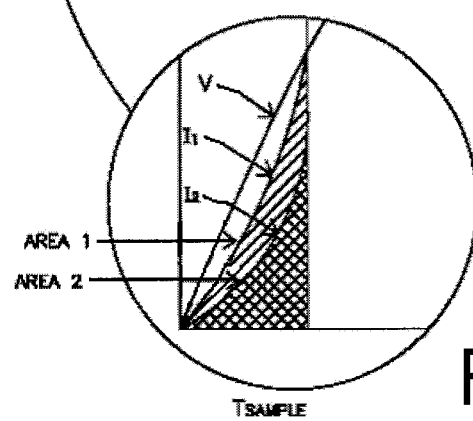
FIG. 6b is an enlarged portion of FIG. 6a showing $T_{sample}$.
Figure 9:
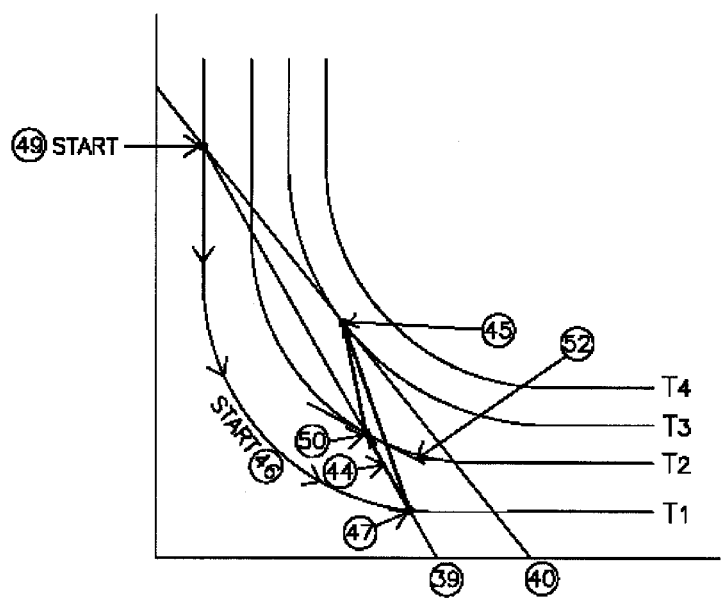
FIG. 9 is a graph showing the load line transition illustrating the sequence of events from the first avalanche to the first thermal curve after thermionic operation.

On arrival at set power condition, a new criterion is applied for controlling plasma operation. FIG. 9 shows a plasma load curve with associated temperature curves. Voltage control has a limit, and this is shown as $V_{max}$. It should be noted that having first arrived at some full power condition, it might be necessary to go to maximum power, and that as long as the $T_{sample}$ area in FIG. 6b shows no signs of decrease, that voltage could stay at that point and the frequency could then be used as the next control parameter.

From that point on the next control criterion is now applied. This criterion makes use of the $T_{sample}$ area capture. Now, the criterion would be to maximize the output voltage generator efficiency by operating with a load line that would ideally be horizontal (an impossible condition as the lamp would be very unstable). The output stage would be at the lowest possible operating switch losses. This is seen in FIG. 5b load line 40. Although the $T_{sample}$ area sample and compare technique would work, the response time would be prohibitive short but not impossible with expensive real time sampling systems. For this reason, the slope of the load line will have to have enough slope to provide sufficient response time to correct lamp operating conditions.

The application of the frequency and voltage control allow navigation of the plasma load line and superimposed source-impedance-line intercept-angle. This is very important as shown in FIG. 9. This figure follows the sequence of events from the first avalanche to the first thermal curve after thermionic operation is achieved.

It can be seen that the load lines and gas curves $T_1$, $T_2$, $T_3$, and $T_4$ have multiple intersections from start at intercept 49 to intercept 47. This is a reality that is also addressed by this invention. The first intersect after avalanche results in a condition known as "glow phase" and is a result of the electrodes not being fully thermionic. The work function is the amount of work needed to remove an electron from the electrode. The amount of work is very high and therefore has a high voltage drop and a high effective lamp impedance. As long as the power input is higher than the thermal outflow, the lamp will transition to thermionic or initial cold plasma curve at point 47. As the thermal equilibrium is reached on the load line 39 and curve $T_2$, the path 44 is followed. If the frequency was lower, and there was more slope of the series impedance load line, the equilibration point would be 50. However, this would be an unwise choice as the slope of the load line approaches the local tangent 52 at point 50 on temperature curve $T_2$. If at an equilibrium point the local tangent to the gas curve approaches the slope of the load line, it will result in the plasma extinguishing and have a long recovery period before the plasma load restarts. Thus, point 45 is a critical point, where the local tangent and the load line are coincident—the tangent line is the same as the load line and is not shown separately. If the lamp tries a small transition to a new temperature, it will extinguish. Load line 40 and curve $T_4$ would not be a consideration with the load lines 39, 40 shown. Sudden changes either by environmental action or by material deployment of the arc constituent materials are not abnormal in plasma loads. Materials are of differing vapor pressures deploy into the arc suddenly and take the heat of vaporization for the internal thermal environment and cause sudden shifts in gas temperature and gas curve slope. The above is well known in the art; however, current solutions are to design the system with a single load line impedance that assures stable operation under all expected conditions at the expense of system efficiency. What is not shown in the art is a dynamic approach that applies multiple criteria to the operation of the system as is deployed in this invention.

Sampling the initial current rise and integrating it over the sample period provides a signal that a slope of the load line and a gas curve tangential slope are approaching equality and therefore an unstable operation. This is an indicator that initiates the actions of a control algorithm; however, it is the understanding of the plasma thermal heat flow reactions of the lamp that leads to the correct control strategy.

This sample can be had by several means such as but not limited to direct digital sampling of the initial current rise shapes or by using a sample and hold integrating circuit.

Figure 10:
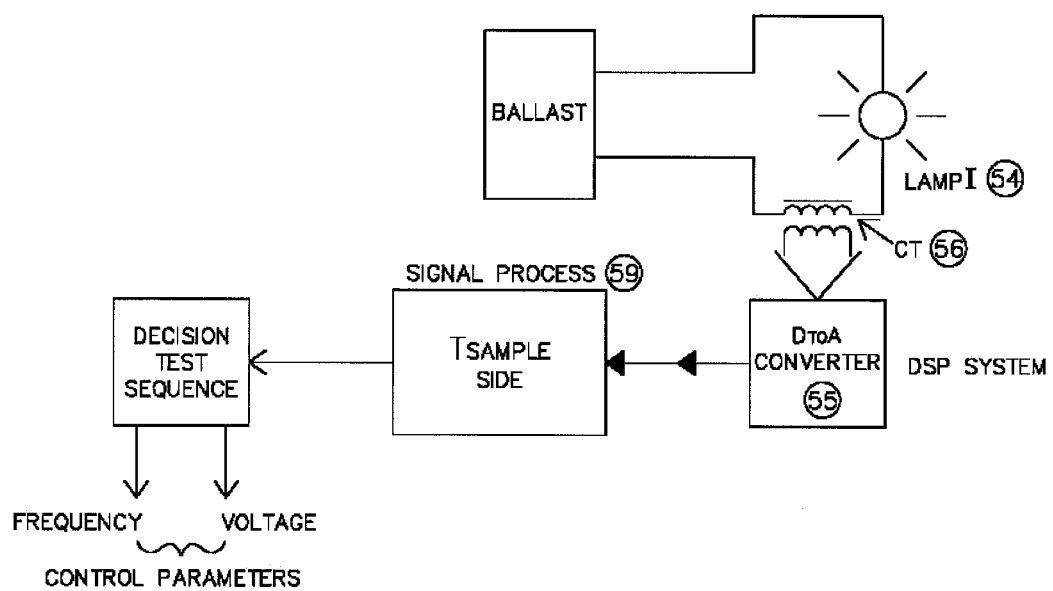
FIG. 10 is a diagram showing the use of a high speed digital processing chip (DSP) to sample the current sense area for processing and control.

The use of a high speed digital signal processing (DSP) to sample a current sense area is the most direct method to capture the data into a digital format for processing and control. FIG. 10 shows a series of process steps. A lamp 54 current is sampled by any possible means known in the art—for this example a center tap transformer 56. The data is captured by some analog to digital conversion method 55. This data is then processed in microprocessor 59. The signal is then processed by an algorithm to provide a number for comparison. One algorithm is integration over the sample time interval. This would be compared to the ideal condition by the process in FIG. 5a.

Figure 11:
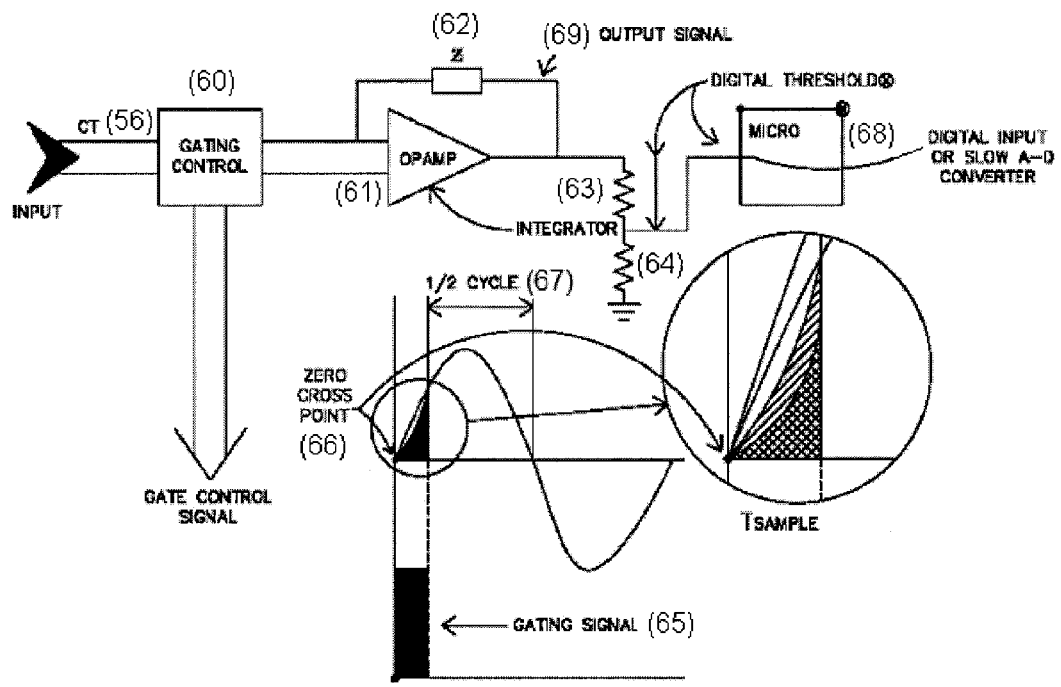
FIG. 11 is an alternate method that could be used to capture the current sense control value.

FIG. 11 illustrates an alternate method that could used to capture the current sense control value. This period is defined $T_{sample}$ in FIG. 6b and as the time from a zero cross point 66 to the defined sample time. This is accomplished by sensing the zero cross point 66 and knowing the half cycle period 67 and counting from 10 to 20 degrees of the 180 half cycle period. This becomes the gating signal 65 generated by a gating control 60 to pass signal to the integrator op amp 61. The feedback signal 62 provides for the integration constants, such as gain and bandpass of the integrating circuit, thus providing the proper signal levels from the input center tap transformer sample signal 56. The signal 56 is then applied directly to a digital pin, thus using the native digital switching threshold of a microcontroller 68 or to another much slower analog to digital convertor such as many low cost 8 bit microcontrollers.

The resistors 63 and 64 proportionalize the signal for each of the above scenarios. For instance, if the digital input is used, the on-threshold will range from 1.5 to 2 volts. If the output is 6 volts for a good-condition, then the signal will be reduced by a little over a third. If it is an analog to digital converter, then the value of the voltage can be as high as the internal or external reference voltage of the converter. Typically, it is 5 volts. The divider resistors 63,64 would be configured to drop 1 volt or more of the output 69 to keep the analog to digital converter less than the reference voltage and/or maximum voltage of the controller input.

Figure 12:
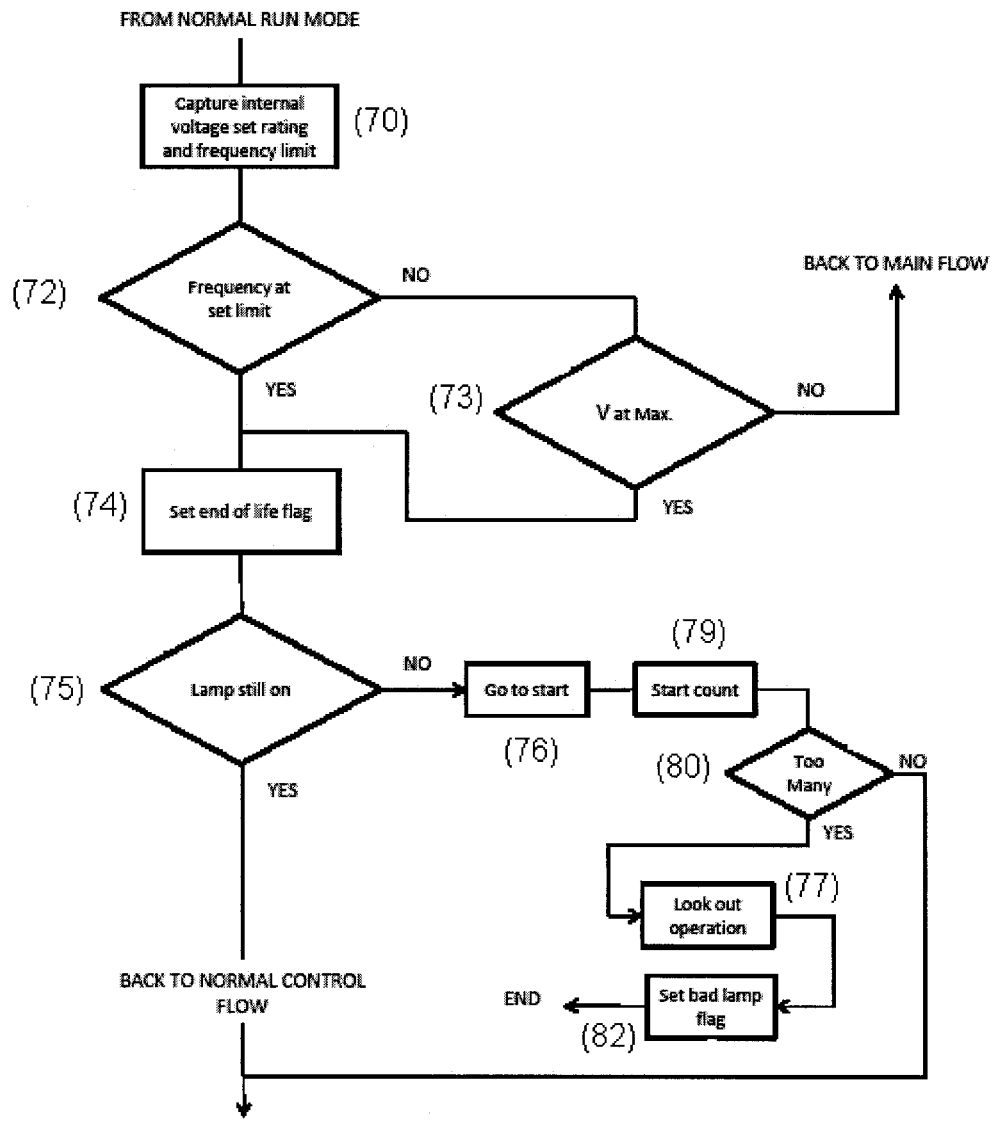
FIG. 12 is a flowchart diagram of the end-of-life scenario.

As with all devices, end of life, under normal circumstances, is the point at which the voltage demand of the lamp exceeds the limit of which the ballast can deliver. Because of the initial current slope, test end of life is the point all internal adjustments to meet the lamp demands are near maximum. This end-of-life scenario is seen in FIG. 12. In step 70, the internal operating values are captured, and we ask how much of the available operating control range remains in the voltage—step 73—and frequency—step 72. If either is at or near its limit, it is flagged that it is nearing end of life—step 74. If a limit has been flagged, and the lamp is out, step 75, then go to start—step 76. The number of starts is logged—step 79. In step 80, a decision can be made that there have been too many starts in too short of a time indicating a bad lamp condition exists and action is needed. The action indicated in step 77 is to lock the ballast out until the condition is eliminated and a bad lamp flag may be set, step 82.

While the specific embodiments have been illustrated and described, numerous modifications come to mind without significantly departing from the spirit of the invention, and the scope of protection is only limited by the scope of the accompanying Claims.

What is claimed is:

1. A method to control and regulate a power supply attached to a non-linear plasma load comprising the steps of:
   utilizing a multi-parametric load line intercept control of a series source impedance;
   sequencing of a voltage and a frequency control;
   allowing a highly dynamic gas plasma load curve to be tracked through a load dynamic without a loss of conduction or plasma stability;
   shaping of an initial current, as a load is energized during a conduction cycle, wherein a means of feedback is provided as to the appropriateness and quality of the adjustment.

2. The method of claim 1 further comprising the step of:
   regulating the frequency and the voltage to move a load line intercept with a thermally variable voltage/current characteristic of a plasma of the non-linear plasma load.

3. The method of claim 1 further comprising the step of:
   controlling the frequency and the voltage at a plurality of different points/conditions of the plasma.

4. The method of claim 1 further comprising the step of:
   identifying art initial rise of a current to indicate plasma stability.

5. The method of claim 1 further comprising the step of:
   comparing a predetermined absolute value related to the current to an ideal value.

6. The method of claim 1 further comprising the steps of:
   continuously determining separate comparative values related to the current over a period of time; and
   comparing each subsequent comparative to a preceding comparative value to determine an operating condition of the non-linear plasma load.

7. The method of claim 1 further comprising the step of:
   utilizing both a resonant and a non-resonate power stage design.

8. The method of claim 1 further comprising the step of:
   identifying a zero cross-point gating signal for a conduction current ramp up area capture.

9. A method to control and regulate a power supply attached to a non-linear plasma load comprising the steps of:
   sampling an initial current rise signal over a predetermined time period in the non-linear plasma load upon an initial powering of the non-linear plasma load;
   converting the initial current rise signal from an analog signal to a digital signal;
   integrating the digital signal over the predetermined time period to arrive at comparison value;
   comparing, the comparison value, against a known ideal condition; and
   increasing a voltage supplied to the non-linear plasma load if the comparison value is lower than the known ideal condition to continue a powering of the non-linear plasma load.

10. The method of claim 9 further comprising the step of:
    sampling a current signal over a plurality of separate predetermined time periods of identical duration wherein a plurality of current signal samples are acquired at discreet points in time.

11. The method of claim 10 further comprising the step of: converting each current signal sample from an analog signal to a digital signal.

12. The method of claim 11 further comprising the step of:
    integrating each digital signal over the predetermined time period to arrive at a plurality of successive comparison values.

13. The method of claim 12 further comprising the step of:
    comparing each subsequent value of the plurality of successive comparison values to a preceding value of the plurality of successive comparison values.

14. The method of claim 13 further comprising the step of:
    comparing, each subsequent value of the plurality of successive comparison values to a preceding value of the plurality of successive comparison values.

15. the method of claim 14 further comprising the step of:
    determining an operating condition of the non-linear plasma load based on a result of the comparing each subsequent value of the plurality of successive comparison values to a preceding value of the plurality of successive comparison values step.

16. The method of claim 15 further comprising the step of:
    determining an impending end-of-life operating condition of the non-linear plasma load by comparing the successive comparison values to a known operating control range of a ballast.

17. The method of claim 16 further comprising the step of:
generating an end-of-life flag in response to an end-of-life condition as determined by the comparison of the successive comparison values the known operating control range of the ballast.

18. The method of claim 17 further comprising the step of:
automatically locking out the ballast in response to the end-of-life flag.

* * * * *

UNITED STATES PATENT AND TRADEMARK OFFICE
CERTIFICATE OF CORRECTION

Page 1 of 1

PATENT NO.        : 8,624,519 B2
APPLICATION NO.   : 13/140904
DATED             : January 7, 2014
INVENTOR(S)       : Denny D. Beasley It is certified that error appears in the above-identified patent and that said Letters Patent is hereby corrected as shown below:

In the Claims

Column 10, lines 5-6, Claim 4, should read:

--4. The method of claim 1 further comprising the step of:
identifying an initial rise of a current to indictae plasma stability.--

Column 10, lines 22-36, Claim 9, should read:

--9. A method to control and regulate a power supply attached to a non-linear plasma load comprising the steps of:
    sampling an initial current rise signal over a predetermined time period in the non-linear plasma load upon an initial powering of the non-linear plasma load;
    converting the initial current rise signal from an analog signal to a digital signal;
    integrating the digital signal over the predetermined time period to arrive at comparison value;
    comparing the comparison value against a known ideal condition; and
    increasing a voltage supplied to the non-linear plasma load if the comparison value is lower than the known ideal condition to continue a powering of the non-linear plasma load.--

Signed and Sealed this
First Day of April, 2014

Michelle K. Lee
*Deputy Director of the United States Patent and Trademark Office*